United States Patent [19]

Clark

[11] 3,841,089
[45] Oct. 15, 1974

[54] FUEL RECLAIMING SYSTEM
[75] Inventor: Herbert Clark, Dallas, Tex.
[73] Assignee: LTV Aerospace Corporation, Dallas, Tex.
[22] Filed: Feb. 20, 1973
[21] Appl. No.: 333,850

[52] U.S. Cl. .......... 60/39.09 F, 417/182.5, 137/202
[51] Int. Cl. ............................................. F02c 9/12
[58] Field of Search ................ 60/39.09 F, 39.09 R; 417/182.5, 196, 197; 137/202

[56] References Cited
UNITED STATES PATENTS

| | | | |
|---|---|---|---|
| 2,438,245 | 3/1948 | Gregg | 417/182.5 |
| 2,446,013 | 7/1948 | Kuyper | 60/39.09 F |
| 2,543,366 | 2/1951 | Haworth et al. | 60/39.09 F |
| 2,627,868 | 2/1953 | Runnels | 137/202 |
| 2,712,218 | 7/1955 | Ritter | 60/39.09 F |
| 3,575,533 | 4/1971 | Bubula | 417/182.5 |
| 3,625,820 | 6/1968 | Gluntz | 417/196 |

FOREIGN PATENTS OR APPLICATIONS 538,676  3/1957  Canada ............................ 417/182.5

Primary Examiner—William L. Freeh
Assistant Examiner—Warren Olsen
Attorney, Agent, or Firm—James M. Cate; H. C. Goldwire

[57] ABSTRACT

A system for recycling surplus fuel which remains in portions of a jet engine after use and which is collected in a dump tank. A dual-function check valve is provided having communication with the interior of the dump tank and comprising a means for allowing the passage of fuel from the dump tank but preventing the passage of gasses from the tank. An ejector pump is provided, having its supply flow inlet connected to the outlet of the check valve and having its motive flow inlet and its outlet connected to respective portions of the fuel supply line of the jet engine, for pumping the excess fuel into the fuel line. In one embodiment, the dual-function check valve includes a valve housing having a chamber containing a rigid valve element which has a specific gravity greater than that of the fuel, and first and second resilient seals adapted to sealingly engage the valve element, the valve housing having upper and lower inner sidewall portions which, in vertical section, are substantially linear. In a preferred embodiment for use with a jet aircraft engine, the ejector pump includes an ejector nozzle having a diameter of about 0.025 to 0.040 inches and a motive-flow-nozzle-to-diffuser area ratio of about 0.30 – 0.45, whereby the fuel tank is emptied by the ejector pump during idling of the jet engine.

5 Claims, 5 Drawing Figures

FUEL RECLAIMING SYSTEM

This invention relates to fuel supply systems for jet engines and, in particular, to a system for disposing of left-over fuel remaining in portions of the engines immediately following shutdown.

An undesirable characteristic of jet engines such as jet turbine aircraft engines is that when such an engine is shut down, a quantity of unused fuel is left within heated portions of the engine such as the fuel manifold and fuel nozzles. If the surplus fuel is permitted to remain, the residual heat of the engine causes evaporation of the fuel, resulting in the formation of a deposit of carbon on the engine interior surfaces and emitting vapor to the atmosphere which produces an unpleasant odor of unburned hydrocarbons in the surrounding area. The unburned hydrocarbons released to the atmosphere are exposed to ultraviolet radiation and broken down chemically, whereby nitrogen oxides are released in the atmosphere, causing a potential health hazard and resulting in the formation of smog. To avoid such problems, provisions have been made in commercial jet aircraft for permitting such leftover fuel to drain into a container or dump tank mounted in the engine nacelle. Fuel in the dump tank, in many aircraft, has then been dumped into the atmosphere when the aircraft has become airborne again. This procedure has caused an increasingly objectional degree of polution of the atmosphere in the vicinity of the larger airports as aircraft has increased.

Previous attempts to dispose satisfactorily of the surplus fuel collected in the dump tank of an aircraft have included a system wherein the fuel is pumped from the tank during flight and discharged into the tail pipe or jet exaust portion of the engine, whereby it was believed that the exaust temperature would be sufficiently high to ignite the surplus fuel and thus prevent the discharge of unburned fuel into the atmosphere. Such an approach introduces problems of its own, however, relating to the difficulty of obtaining combustion of fuel in the high velocity exaust flow. As is well-known to those skilled in the arts relating to the design of afterburners for jet aircraft engines, successful combustion in the jet exaust flow entails rather sophisticated techniques related to the difficulty of obtaining combustion because of the exaust airflow which is of a greater velocity then the flame propagation velocity of the fuel, the reduced oxygen level of the exaust, and the cooling effect of evaporation of the injected fuel, which tends to prevent the fuel from reaching its flash point before it has been discharged from the aircraft.

If complete combustion of the fuel is to be obtained, it is thus preferable that the surplus fuel be recylcled through the fuel supply line to permit combustion within the engine. This more sophisticated approach has not been successfully adapted in prior systems, however, because of several design problems involved. Such a fuel reclaiming system, apart from the teachings of the present disclosure, may typically require additional, pump actuating and control means operable at appropriate times, such equipment entailing an undesirable, additional cost to the aircraft for a system not essential to operation of the aircraft. It has recently been proposed, for example, to employ a fluid ejector pump, driven by motive flow derived from one of the engine fuel pumps, operable to pump fuel collected in a sump tank back into the fuel supply line. In the past, however, such an ejector pump has required a motive flow rate which would consume a substantial percentage of the outlet of the fuel pump, and thus, additional control means were required to prevent operation of the ejector pump until the aircraft engine pump was operating at a relatively high rate, as during takeoff or flight. It is, rather, preferred that the fuel be exhausted while the jet engine is idling and before takeoff, because of safety considerations, but fuel flow at idling velocities is typically of a relatively low rate at which a diversion of a portion thereof to power an ejector pump would not be compatible with satisfactory fuel flow requirements for the aircraft engine. Thus, it has been necessary in such systems to provide an additional control means for shutting off the motive flow to the ejector pump during operation of the aircraft engine at lower velocities. This approach adds an undesirable degree of complexity and expense to the system.

It has been proposed in prior-art systems to employ a simple float valve fitted within the outlet opening of the sump tank for permitting egress of fluid only when fuel remained in the tank, and a unidirectional check valve positioned downstream of the float valve and directioned to prevent reverse flow of the fuel back to the tank. Such a system has the disadvantage that, after the surplus fuel has been exhausted by a pump downstream of the check valve and when the pump ceases to operate, a partial vacuum remains between the float valve and the check valve which prevents the valve closure element of the float valve from floating upwardly when surplus fuel is again drained into the sump tank. Thus, the float valve, or the check valve, must be constructed with inefficient sealing elements or with bleed orifices or the like if satisfactory, repeated operation thereof is to be obtained, which may result, for example, in an undesired, reverse flow of fuel to the sump tank from the fuel system or in introduction of air into the fuel lines from the tank.

It is, accordingly a major object of the present invention to provide a new and improved apparatus for reclaiming surplus fuel present in a jet engine following operation thereof, which apparatus is operable to return the surplus fuel to the fuel supply system of the engine whereby the fuel is consumed by the engine.

Another object is to provide such an apparatus which may be conveniently added to existing jet aircraft engines without extensive modifications thereof.

A further object is to provide such a fuel-reclaiming system in which means are provided for ensuring that air is not pumped into the fuel line of the engine after the surplus fuel has been removed from the dump tank and additionally for preventing any reverse flow of fuel from the fuel line to the dump tank.

Yet another object is to provide an apparatus having the abovestated advantages which nonetheless can be inexpensively manufactured and installed.

Other objects and advantages will be apparent from the specification and claims and from the accompanying drawing illustrative of the invention.

IN THE DRAWING

Figure 1:
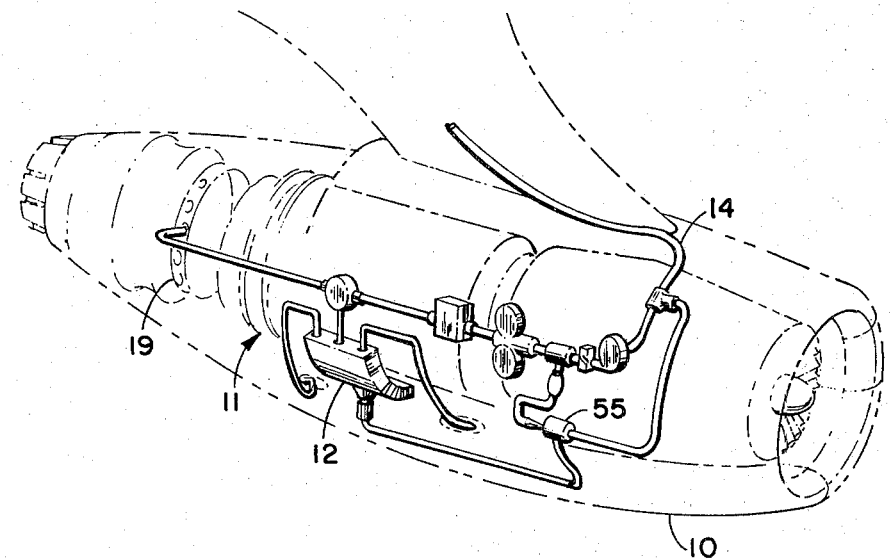
FIG. 1 is a sectional view, partially diagrammatic, of portions of an engine nacelle containing a jet turbine aircraft engine and showing the relative positioning therein of portions of a preferred embodiment of the present invention.

With reference to FIG. 1, an engine nacelle 10 containing a turbine jet aircraft engine 11 is shown having a conventional sump or dump tank 12 employed for receiving surplus fuel remaining in the fuel supply system of the engine 11 upon shutdown of the engine. A preferred embodiment of the fuel reclaiming system of the present invention is shown generally at 13. With primary reference now to FIG. 2, the conventional, fuel supply system of the engine 11 includes a fuel supply line 14 extending from a fuel container, not shown, external of the nacelle 10. The fuel supply line 14 is connected in series with a relatively low pressure centrifugal pump 15 drivingly connected to the engine gear box and thus driven by the engine rotor, the pump 15 being positioned upstream of a high pressure "main stage" pump 16 typically of the dual gear type and also driven by the engine rotor during operation of the engine 11. Since the construction of these components and of the components now to be described relating to the jet engine fuel supply system is generally known in the art, they will not be described in detail herein. Fuel under relatively high pressure from the high pressure pump 16 flows to a fuel control metering system 17, which is a complex valving system operable to supply an appropriate amount of fuel downstream, through a dump valve 18, to a fuel manifold 19 which communicates with a plurality of injection nozzles through which the fuel is sprayed into the combustion chamber of the engine. When the engine 11 (FIG. 1) is shut down after use, a quantity of fuel, typically of the order of from one half to two quarts, remains in the manifold 19, nozzles 20, and connected fuel lines and, since these components are heated, at shutdown, to temperatures which may approximate 800° F or more, the surplus fuel quickly begins to evaporate within the engine if the fuel is not removed. Such evaporation or "boil off" of the fuel within the engine 11 is undesirable, as has been previously mentioned, in that fumes of partially burned hydrocarbons are then given off into the atmosphere, and deposits of carbon are formed on the interior surfaces of the manifold 19 and the nozzles 20. To avoid such problems, fuel drainage systems have been routinely employed in commercial jet engines to permit the surplus fuel to drain from the manifold 19 when the engine 11 is shutdown. These drainage systems are typically of the type shown in FIG. 2 wherein a drain valve 18 is connected in series with the fuel line 14 at a location below the manifold 19 and is operable to conduct fuel drained from the manifold 19 through an inlet opening 22 of the dump tank 12, the tank also being positioned below the drain valve 18.

The drain valve 18 of such a system is typically of a type having a spring-actuated valving control mechanism responsive to fuel pressure in the fuel supply line 14 and operable for permitting the passage of fuel from the fuel line 14 to the manifold 19 when a predetermined level of fuel pressure is present, and for permitting drainage of fuel from the manifold 19 to the dump tank 12 when the fuel pressure is below the predetermined level, as when the engine is shut down. Such fuel dumping systems have typically also employed a ram inlet vent, diagrammatically represented at 25, opening through the outer skin of the nacelle 10 for receiving ram air from the airflow adjacent the nacelle during flight, the ram vent having communication, through a conduit 26, to the interior of the dump tank 12. A drainage conduit 27 is typically provided in communication with the dump tank interior, at a location adjacent the lowermost portion of the tank 12, and extends therefrom over the side wall of the tank and through a second opening 28 through the nacelle 10. The dump tank 12 is typically provided with an outlet or drain opening 29 having internal threads for receiving a drain plug (not shown).

The operation of fuel supply and drainage systems of the type thus far described is generally known to those in the art. Fuel is supplied to the low pressure dump 15 from a fuel supply, not shown, under relatively low pressure, e.g., approximately 15–30 p.s.i., and then flows in the direction indicated by the arrows 30 to the high pressure pump 16 under a higher pressure of approximately 35–100 p.s.i. The ram inlet vent 25 is operable to increase the pressure within the dump tank 12 as the airspeed increases, and the pressure within the tank 12 reaches a level sufficient to cause ejection of the surplus fuel through the drainage conduit 27 when a predetermined airspeed is attained, according to principles well-known in the art. As has been previously suggested, such a fuel dumping system is undesirable from an environmental standpoint, in that the surplus fuel dumped from aircraft in the vicinity of major airports results in an objectionable level of atmospheric pollution. Moreover, the presence of fuel in a dump tank 12 adjacent the engine during flight is a safety hazard, and it is thus preferable to remove the fuel during initial idling of the engine 11 and before takeoff.

The fuel reclaiming system 13 of the present invention is particularly adapted to be installed conveniently in existing fuel supply systems of the type thus far described. With added reference to FIG. 3, a dual-function check valve 31 constructed according to a preferred embodiment of the invention is preferably threadingly connected within the drain opening 29. The check valve 31 conveniently has a housing structure 32 which is conveniently of a 3-part construction consisting of upper and lower, vertically channeled couplers 33, 34 respectively connected to upper and lower end portions of a generally tubular, elongated housing member 35. The elongated housing member 35 is preferably in the form of a sleeve, having upper and lower, inner wall portions 37, 38 which extend, respectively, from the upper and lower ends of the elongated housing member 35 toward its mid portion. The upper and lower, inner wall portions 37, 38 define respective frustoconical volumes within the housing member 35 which diverge from the respective ends of the housing member 35 toward its center. Thus, the wall portions 37, 38 are at least substantially linear, when viewed in vertical section of the housing 35, a construction which enhances the reliability of the valve 31 as will become apparent from the description to follow. The housing member 35 is externally threaded along its end portions adjacent the upper and lower inner wall portions 37, 38, and the upper and lower couplers 33, 34 are suitably constructed in the form of internally and externally threaded pipe adaptors having enlarged, hexagonal head portions 39, 40 having internal threads for engaging the respective end portions of the housing 35, and each suitably having an externally threaded shank portion 41, 42 coaxial with the housing 35 and projecting outwardly therefrom. The shank 41 of the upper coupler is conveniently adapted to be threadingly engaged within the outlet or drain opening 29 of the dump tank 12. The channeled couplers 33, 34 thus define first and second orifices 43, 44, the first orifice 43 communicating with the interior of the dump tank 12 through the outlet opening 29 of the tank. The housing 35 encloses an elongated chamber 45, the first and second orifices 43, 44 having communication with the chamber. The first and second orifices 43, 44 have minimum diameters smaller than the minimum diameters of the housing chamber 45 (defined by the upper and lower, inner wall portions 37, 38 at the end faces of the housing member 35). First and second, annular recessions 46, 47 are formed in the inner surfaces of the upper and lower couplers 33, 34, respectively, coaxial with the respective couplers 33, 34, between the respective internal threads of the couplers 33, 34 and the orifices 43, 44, and respectively confronting the upper and lower end surfaces of the housing 35. First and second O-ring seals 48, 49 are respectively seated within the grooved recesses 46, 47 for providing sealing association between the couplers 33, 34 and the housing 35. Between the seals 48, 49 and the respective orifices 43, 44 of the couplers 33, 34, the respective inner surfaces of the couplers are gently curved to define annular, cambered lips which respectively define first and second valve seats 50, 51 confronting the chamber 45 and respectively coaxially encircling the first and second orifices 43, 44.

Figure 3:
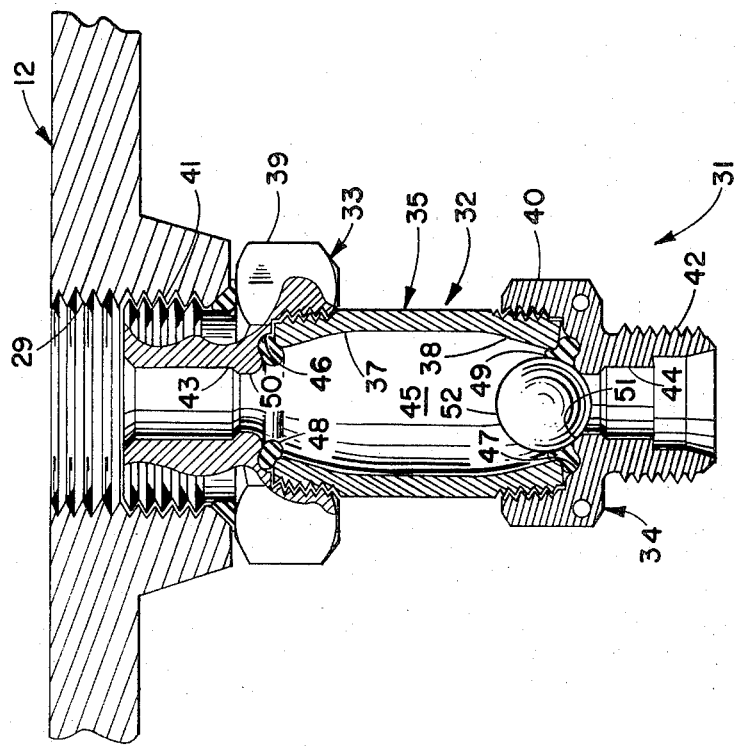
FIG. 3 is a sectional view of the dual-function check valve of the fuel-reclaiming apparatus of FIGS. 1 and 2 and of portions of the dump tank.

Contained loosely within the chamber 45 is a preferably spherical valve member 52 having a specific gravity less than that of the fuel employed. In the preferred embodiment, the valve member 52 is a substantially rigid structure, that is, a structure substantially inflexible during normal use. The valve member 52 is preferably a hollowed sphere of aluminum having a wall thickness thin enough to provide a specific gravity for the sphere volume of 0.66 or less. In one embodiment, a hollow, aluminum sphere of about three-eighths inches with a wall thickness of 0.022 inches has been successfully employed. The valve member 52 is of a diameter smaller than the inner diameters of the housing member 35 at its end portions, but larger than the orifices 43, 44, whereby the valve member 52 is adapted to seat against respective ones of the valve seats 50, 51 when urged in an upward or downward direction. The valve member 52 has a diameter slightly larger than the inner diameter of the seals 48, 49, whereby the valve member may be sealingly associated with respective ones of the seals, but it is of a sufficiently small diameter to permit it to rest against respective ones of the valve seats 50, 51 within the associated seals 48, 49 rather than resting entirely against a respective ones of the seals, the valve seats 50, 51 thus comprising means supporting the valve member for preventing damaging distortion or wear of respective, adjacent ones of the seals 48, 49 upon the valve element being urged forceably into contact with the respective valve seat, as shown in FIG. 3 with respect to the second valve seat 51. It thus will be seen that this construction minimizes the stresses which may be applied to the seals 48, 49 during use, prolonging their useful life. The use of a rigid valve element 52 rather than a flexible one permits its construction of more durable material than those flexible materials usable for such a light-weight spherical element able to withstand the normal operating pressures. Additionally, the seals 48, 49 serve dual functions, first, of providing sealing association between the valve element 52 and respective ones of the valve seats 43, 44 and second, providing a seal between the end surfaces of the housing 35 and the respective, adjacent couplers 33, 34.

Figure 2:
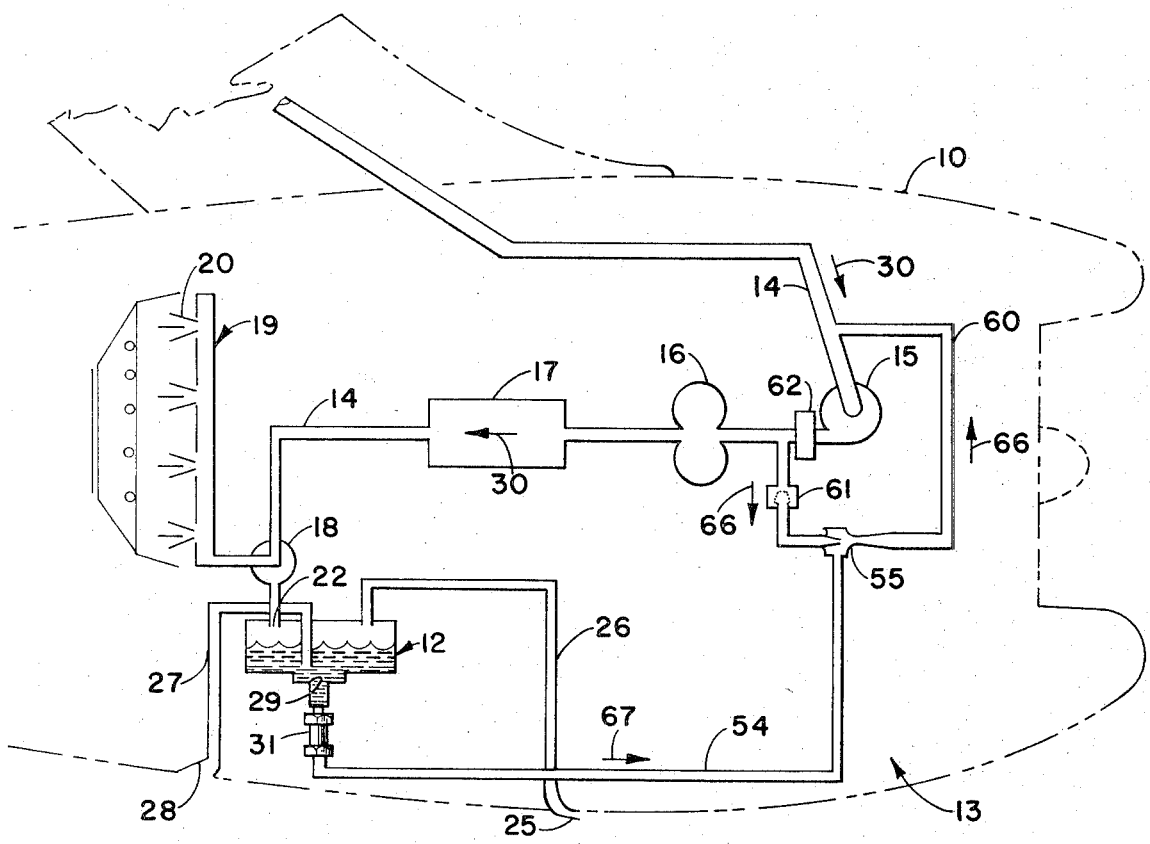
FIG. 2 is a diagrammatic representation of the preferred embodiment of the fuel reclaiming apparatus of FIG. 1.
Figure 4:
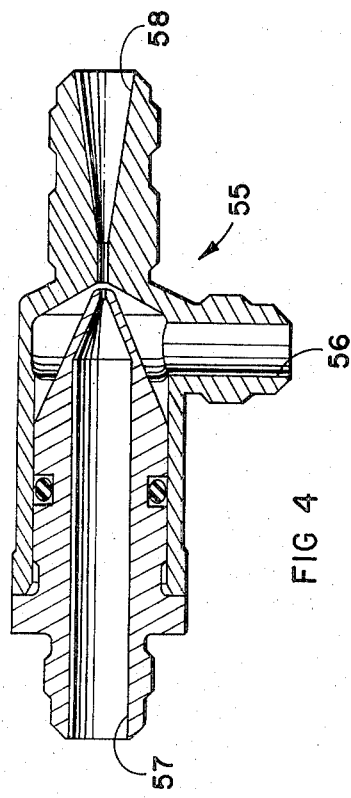
FIG. 4 is a sectional view of the fluid ejector pump of the preferred embodiment of the invention.

Referring again to FIG. 2, an ejector supply conduit 54 has one end connected, by any suitable fitting, or coupling means, to the lower coupler 34 (FIG. 3) of the check valve 31 and extends therefrom to a fluid ejector pump 55, the construction of which is seen more clearly in FIG. 4. The ejector pump 55 is of the type having a supply flow inlet 56, a motive flow inlet 57, and a conically diverging discharge nozzle or outlet 58. The supply inlet 56, motive flow inlet 57, and outlet 58 are respectively connected to and communicate with the supply conduit 54, a motive flow conduit 59, and an outlet conduit 60 (FIG. 2).

The outlet conduit 60 extends from the ejector pump 55 to the fuel supply line 14 and is connected to the fuel line 14, by a suitable T-fitting, not shown, at a location on the line 14 upstream of the low pressure fuel pump 15, which provides an outlet pressure of about 30 p.s.i. at idling, suitable for the motive flow of the ejector pump. The motive flow conduit 59 is similarly connected to the fuel line at a location on the line downstream of the fuel pump 15, and, in the present embodiment, between the fuel pump 15 and the high-pressure pump 16. A unidirectional check valve 61 is connected in communication with the motive flow conduit 59 in series between the ejector pump 55 and the fuel line 14 and directioned to permit fluid flow through the motive flow conduit 59 in a direction along the conduit fuel line 14 toward the ejector pump 55, but to prevent fluid flow in the opposite direction. Additionally, a fuel line filter 62, connected in series between the motive flow conduit 61 and the low pressure pump 15, is effective to retain foreign material in the fuel which might tend to block the motive flow inlet 57 of the pump 55. Thus, the motive flow conduit 59 comprises a means for providing communication between the pump motive flow inlet 57 (FIG. 4) and the fuel line 14 at a location on the fuel line downstream of the fuel pump 15, and the outlet conduit 60 comprises means providing communication between the ejector pump outlet 58 (FIG. 4) and the fuel line at a location thereon upstream of the fuel pump 15. The supply conduit 54 comprises means providing communication between the ejector pump supply flow inlet 56 (FIG. 4) and the second or lower orifice 44 of the dualfunction check valve 31.

Figure 5:
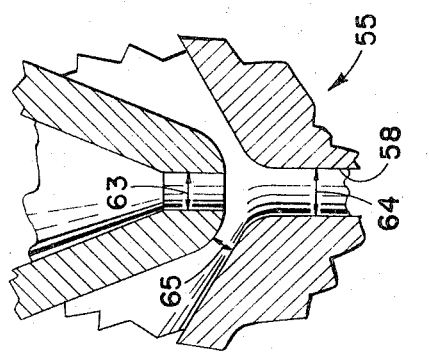
FIG. 5 is a sectional view, in an enlarged scale, of a fragmentary portion of the ejector pump of FIG. 4.

As has been previously suggested, ejector pumps of prior-art systems have required a minimum motive flow which could not be satisfactorily diverted from the fuel supply line 14 during idling of the engine 11, and additional (complex and expensive) control means have been required to shut off the bypass flow through the motive flow conduit (59) during operation of the engine at idling or at low operating rates. The fuel supply flow rate to the engine may be typically of the order of 800 pounds per hour at idling, and it is then necessary that the motive flow rate be of the order of 100 lbs/hr.

or less if satisfactory performance of the fuel supply system of the aircraft is to be maintained. The ejector pump 55 of the present invention employs both a large ejector-nozzle-to-diffuser area ratio, of approximately 0.30 to 0.50, and a small ejector nozzle diameter of about 0.035 to 0.040 inches to achieve a rate of supply flow of at least about 50 pounds per minute from the supply conduit 54 when supplied with a motive flow pressure of about 30 p.s.i. With additional reference to FIG. 5, the motive flow nozzle diameter, indicated at 63, is of the order of 0.035 to 0.045 inches and, in one typical embodiment for a fuel supply flow, at idle, of 800 lbs/min. at 30 p.s.i., is nominally 0.032 inches. The diffuser minimum diameter 64 is preferably about 0.052 inches, and the spacing between the nozzle tip and the diffuser orifice, indicated at 65, is approximately 0.019 in. Squaring the nominal figures 0.032 and 0.052 and dividing $(0.032)^2$ by $(0.052)^2$ gives a preferred nozzle-to-diffuser area ratio of approximately 0.379. It has been found by experimentation that a range between about 0.30 to 0.50 will provide generally favorable results for commercial aircraft engines. Thus, the present ejector pump is simply operable in response to operation of one of the aircraft engine pumps and is powered thereby, yet is effective to drain the tank 12 during idling of the aircraft engine.

In operation, upon the engine 11 being shut down after use, fuel is drained from the fuel manifold 19 through the drain valve 18 to the dump tank 12 as in the conventional systems described previously. Part of the fuel thus drained to the dump tank 12 then flows into the dualfunction check valve 31. As soon as a small quantity of fuel has entered the check valve 31, the valve member 52 floats upon the surface of the fuel, opening the second or outlet orifice 44. If the ejector supply conduit 54 is empty of fuel, fuel then flows into the ejector supply conduit 54 until it is filled to the level of the first orifice 43 of the check valve 31. As the fuel level within the check valve 31 then rises, the valve member 52 is raised upon the fuel surface until it seats against the first or upper seal 48, whereupon the first orifice 42 of the valve 31 is closed. The dump tank 12 then collects the surplus fuel remaining in the engine manifold 19 and associated components, and rapid evaporation or "boil-off" of substantial quantities of fuel within the manifold by the residual heat of the engine, with the attendant emission of unborned hydrocarbons to the atmosphere, is effectively prevented. The surplus fuel then remains in the dump tank 12 until the engine 11 is restarted. The upper and lower sidewall portions 36, 37 are preferably linear in vertical section because of the tendency of the spherical element 52 to become adhered to internally concave surfaces by fluid surface tension when the fuel is exhausted from the chamber 45. Thus, conventional dual-function valves of the type having concave inner surfaces would not be sufficiently reliable for aircraft usage.

When the engine 11 is restarted, the fuel pump 15 and 16 are operable. As has been previously mentioned, the fuel within the fuel supply line 14 increases in pressure by at least 15 to 20 p.s.i., to a level of about 35 p.s.i. or more, as the fuel passes through the low pressure fuel pump 15 during operation of the engine 11 at idling velocity. A continuous, circulatory flow, indicated by arrows 66 is thus produced through the ejector pump 55 from the motive flow conduit 59 to the outlet conduit 60 and back through the engine pump 15. The ejection of fuel at relatively high velocity through the motive flow nozzle reduces the pressure within the supply conduit 54 and results in fuel being drawn through the supply conduit 54, in the direction indicated by arrow 67, to the ejector pump 55 and returned, via the conduit 60 and the fuel supply line 14, to the engine 11. When the fuel is exhausted from the dump tank 12 and the interior chamber 45 of the check valve 23, the valve member 52 then seats against the lower, second seal 49 and the second valve seat 51, preventing further fluid flow from the check valve 31 and thus preventing the passage of air into the fuel supply line 14. The dual-function check valve 31 is further operative to prevent any reverse flow of fuel to the dump tank 12, the upper seal 48 and valve seat 50 being operable to engage the valve member 52 if fluid is reintroduced to the chamber 45 from the second or lower orifice 44. This prevents fuel being pumped into the dump tank from the fuel supply line 14 before the engine 11 and fuel pumps 15, 16 are started. Such a reverse flow of fuel would be passed through the drain conduit 27 and onto the ground if the check valve 31 were not used, thus making necessary more extensive modifications of the line 27 or tank 12 to prevent such overflow if the check valve 31 of the present invention were not employed. It can be seen that the dual-function check valve 31 avoids the problems previously discussed with respect to the use of a conventional float valve combined with a unidirectional check valve positioned downstream thereof, the dual-function check valve 31 performing the functions of both the float valve and the check valve. The present system thus does not require bleed orifices or the like to relieve a vacuum in the ejector supply line 54 as may be formed between such a float valve and the downstream check valve, as has been discussed, and the seals 48, 49 of the valve 31 are operable to completely close the valve 31 when fuel is exhausted therefrom. During operation of the engine 11 and pump 15, however, sufficient vacuum is present within the supply conduit 54 to keep the valve element 52 seated against the seal 49, thus preventing any leakage during banked, or even inverted flight of the aircraft.

Because of the efficient operation of the ejector pump 55 wherein satisfactory pumping of fuel is obtained with a motive flow rate of, e.g., only 100 lbs/hr. of fuel, the present system can be continuously connected into the fuel line 14, and no additional valving or control means is required to shut off the motive flow during idling of the engine 11. The expense and added complexity of such control means is thus avoided, and the ejector pump 55 is operable to exhaust the dump tank 12 while the engine 11 is idling and before takeoff of the aircraft. While the system has been described with reference primarily to aircraft usages, other applications are also possible in other fields in cases wherein liquids only are to be drained from a tank, and liquid must be prevented from returning to the tank. For example, the system is advantageously used as a bailing system for marine vessels wherein water must be removed from a compartment.

It will also be seen from the above description that the present fuel reclaiming system, while providing the above-stated advantages over prior-art systems, is, nevertheless, of relatively simpler and less expensive construction than such prior-art systems.

While only one embodiment, together with modifications thereof, of the invention has been described in detail herein and showed in the accompanying drawing, it will be evident that various further modifications are possible in the arrangement and construction of its components without departing from the scope of the invention.

What is claimed is:

1. In a system for collecting and disposing of fuel remaining in a jet engine after shutdown wherein a dump tank, having inlet and outlet openings, is provided for collecting fuel remaining in portions of the engine and wherein a fuel pump, connected in series with the fuel line, is operative to supply fuel to the engine, a fuel reclaiming system, comprising:

a dual-function check valve having first and second orifices, the check valve, in use, being positioned externally of the dump tank, the first orifice communicating with the interior of the dump tank through the outlet opening of the tank, the check valve comprising means initially preventing passage of fuel or gasses from the dump tank and, alternatively upon the occurrence of a predetermined differential pressure across the check valve, allowing the drainage of substantially all fuel present in the dump tank, through the check valve from the first orifice through the second orifice, but preventing gaseous flow through the check valve from the first orifice and through the second orifice;

an ejector pump having a supply flow inlet, a motive flow inlet, and an outlet;

means providing communication between the ejector pump supply flow inlet and the second orifice of the dual-function check valve;

means providing communication between the ejector pump motive flow inlet in the fuel line at a location on the fuel line downstream of the fuel pump; and means providing communication between the ejector pump outlet and the fuel line at a location on the fuel line upstream of the fuel pump.

2. The apparatus of claim 1, wherein the dual function check valve has a housing structure enclosing a chamber, the first and second orifices communicating with the chamber, the check valve having first and second valve seats respectively encircling the first and second orifices, the check valve having a valve member contained within the housing chamber and having a specific gravity less than that of the fuel, the valve member comprising a means seating against the first valve seat and closing the first orifice upon the chamber being filled with fuel and seating against the second valve seat and closing the second orifice upon the chamber being filled with gas.

3. The apparatus of claim 2, the dual function check valve being oriented with the first orifice positioned above the second orifice, the valve chamber being of elongated configuration and having a transverse minimum diameter greater than the maximum diameter of the valve member.

4. The apparatus of claim 3, the valve member being spherical in configuration and of rigid construction, the valve having first and second, annular seals respectively seated in corresponding annular grooves formed in the valve housing structure interior surface coaxially of the respective orifices, and adjacent the first and second valve seats, respectively, each valve seat comprising a means for supporting the valve member in sealing contact with the corresponding, adjacent seal and for supporting the valve member to prevent damaging distortion of the respective, adjacent seal.

5. The apparatus of claim 3, the valve member being of spherical configuration, the valve housing structure comprising an elongated, tubular member having upper and lower, inner surfaces which respectively define frustoconical volumes, the inner surfaces being substantially linear in vertical section.

* * * * *

UNITED STATES PATENT OFFICE
CERTIFICATE OF CORRECTION

Patent No. 3,841,089            Dated October 15, 1974

Inventor(s) Herbert (nmi) Clark

It is certified that error appears in the above-identified patent and that said Letters Patent are hereby corrected as shown below:

Column 1, line 29, the word "aircraft" should be cancelled and -- air traffic -- inserted therefor; lines 34, 35, 40, 43, 45, and 47, "exaust" should read -- exhaust --; line 46, "then" should read -- than --. Claim 1, column 9, line 36, "in" should read -- and --.

Signed and sealed this 8th day of April 1975.

(SEAL)
Attest:

RUTH C. MASON
Attesting Officer

C. MARSHALL DANN
Commissioner of Patents
and Trademarks